United States Patent [19]

Schollmeier

[11] 4,131,854
[45] Dec. 26, 1978

[54] SWITCHING CIRCUIT FOR REGULATING THE REPETITION RATE OF CLOCK PULSES

[75] Inventor: Gero Schollmeier, Gauting, Fed. Rep. of Germany

[73] Assignee: Siemens Aktiengesellschaft, Fed. Rep. of Germany

[21] Appl. No.: 816,081

[22] Filed: Jul. 15, 1977

[30] Foreign Application Priority Data

Jul. 16, 1976 [DE] Fed. Rep. of Germany ....... 2632165

[51] Int. Cl.$^2$ ............................................. H03B 3/04
[52] U.S. Cl. ........................................ 328/63; 328/55; 328/155; 178/69.1; 328/140
[58] Field of Search ................... 328/140, 63, 55, 155; 307/208, 269; 178/69.5 R

[56] References Cited

U.S. PATENT DOCUMENTS

| | | | |
|---|---|---|---|
| 3,962,541 | 6/1976 | Seidel | 178/69.5 R |
| 3,980,820 | 9/1976 | Niemi et al. | 328/155 X |
| 4,034,348 | 7/1977 | Rathbun | 328/63 X |

Primary Examiner—John S. Heyman
Attorney, Agent, or Firm—Schuyler, Birch, Swindler, McKie & Beckett

[57] ABSTRACT

The invention relates to a novel switching circuit for regulating the repetition rate of clock pulses generated by a clock pulse generator. This repetition rate regulation of the clock pulses thereby controls the sampling instants at which a data signal is sampled. The best possible sampling interest is found by sampling at a first zero crossing of a distorted data pulse after its maximum value. The circuit of the invention generates a first signal which corresponds to the sign of the difference between the actual and the desired values of the data signal at the sampling instants; the circuit also generates a second signal which corresponds to the sign of the desired value of the data signal. A delay element delays the second signal by a period of the clock pulse. A multiplier circuit multiplies the first signal by the delayed second signal and produces an output control signal which regulates the repetition rate of the clock pulse generator.

3 Claims, 4 Drawing Figures

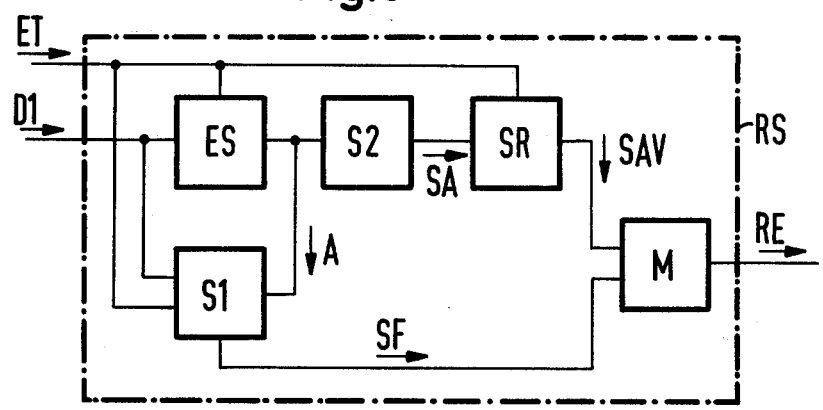
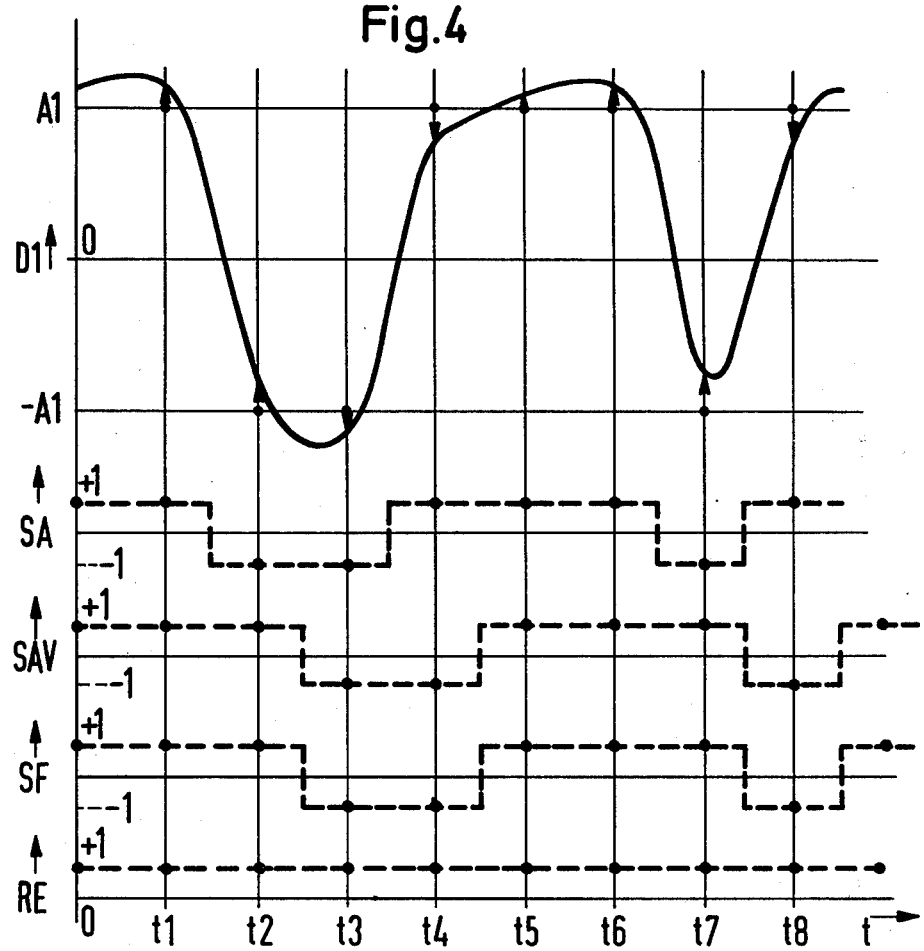

SWITCHING CIRCUIT FOR REGULATING THE REPETITION RATE OF CLOCK PULSES

BACKGROUND OF THE INVENTION

The invention relates to a switching circuit for regulating the repetition rate of clock pulses; these pulses determine the sampling times of a data signal transmitted from a data transmitter to a data receiver. The clock pulses, which are produced by a clock pulse generator, have a repetition rate which depend upon a control signal applied to the clock pulse generator.

The regulation of the sampling time of synchronously transmitted data during its transmission from a data transmmitter to a data receiver greatly influences transmission quality. The demands made on the regulation of the repetition rate of the clock pulses are the more exacting, the higher the data signalling rate for a given bandwidth. At the same time, however, with increase in data signalling rate, there are also greater unavoidable variations of group delay and transmission loss. Consequently, an impairment in transmission quality results, in particular when passing from binary to multistage transmission.

To regulate the repetition rate of clock pulses as a function of a control signal, the use of a circuit has been disclosed in the prior art wherein an oscillator signal is applied to an input of a frequency divider. The frequency divider has a division ratio which varies as a function of a control signal applied to it; the output of the frequency divider supplies clock pulses. The circuit of the invention, however, comprises a regulation circuit to which an input signal and the clock pulses are applied and which generates the control signal in such a way that the clock pulses and the input signal have the same repetition rate and the same phase. If the input signal consists of a data signal received in a data receiver, the data signal can be sampled with the aid of the clock pulses.

SUMMARY OF THE INVENTION

It is a principal object of the invention to provide a switching circuit for regulating the repetition rate of a clock pulse generator utilizing a generated control signal which is applied to the clock pulse generator to obtain the best possible sampling of data signals.

The above object of the switching circuit of the invention is achieved by utilizing a first switching stage which generates a first signal corresponding to the sign of the difference between the instantaneous value and the desired value of the data signal at particular sampling instants. A second switching stage generates a second signal corresponding to the sign of the desired value of the data signal; a delay circuit delays the second signal by a period of the clock pusles. Finally, a multiplier circuit multiplies the first signal by the delayed second signal to produce an output control signal which regulates a clock pulse generator.

The switching circuit built in accordance with the teachings of the invention has the following advantages: sampling instants having greater precision are obtained; and, obtaining sampling, wherein the variance (i.e., the square of the standard deviation) during the sampling is quite small.

To find the desired value of the data signal, it is convenient to utilize a threshold element, shown as ES in FIG. 3. The data signal is applied to the input of this threshold element and it supplies output signals corresponding to the desired values of the data signal. If the switching stages are made up of digital devices, it is convenient to provide as a delay circuit a shift register and as a multiplier circuit an Exclusive-OR circuit.

A preferred embodiment of the switching circuit in accordance with the principles of the invention will be described hereinbelow by reference to FIGS. 1-4:

FIG. 3 is a block diagram of regulation circuit RS which produces clock generator control signal RE; and FIG. 4 shows time waveform diagrams of signals at various points in the regulation circuit RS.

DETAILED DESCRIPTION OF THE DRAWINGS

Figure 1:
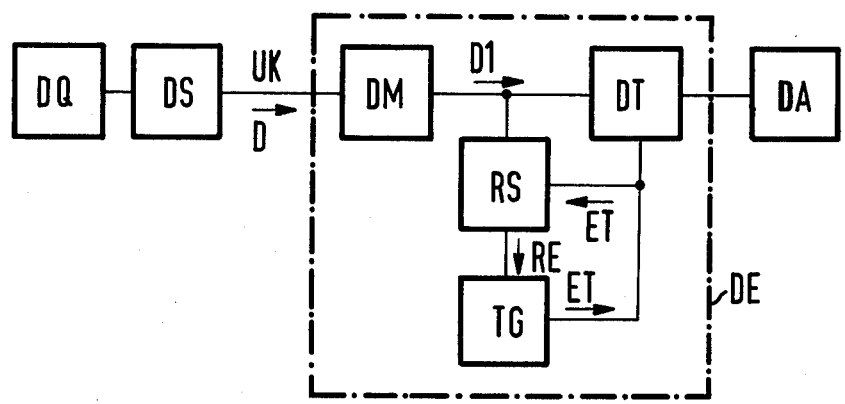
FIG. 1 is a block diagram of a data transmission system comprising data transmitter DS and data receiver DE. Data receiver DE comprises clock generator TG and regulation circuit RS.

Referring to FIG. 1, there is shown a data transmission system wherein data source DQ supplies data to data transmitter DS. Data transmitter DS generates modulated data signals D and transmits this data, via transmission channel UK, to data receiver DE. Data transmitter DE comprises demodulator DM which produces demodulated data signals D1: these signals are thereafter supplied to detector DT and to the input of regulation circuit RS. Detector DT recovers the data from demodulated data signals D1 and supplies this data to data sink DA.

Data receiver DE further includes clock generator TG which produces clock pulses ET; these pulses are applied to the input of regulation circuit RS and to detector DT. Regulation circuit RS, receiving both clock pulses ET and demodulated data signals D1 at its input, generates a control signal RE which is supplied to clock generator TG. Clock generator TG varies the repetition rate of clock pulses ET as a function of control signal RE.

Clock generator TG may comprise a programmable counter, having a division ratio which varies as a function of control signal RE, and an oscillator which supplies meter pulses to a counting input of the counter. Accordingly, the optimum sampling instant for the recovery of the transmitted data is set with the aid of clock pulses ET supplied at the output of the counter.

Figure 2:
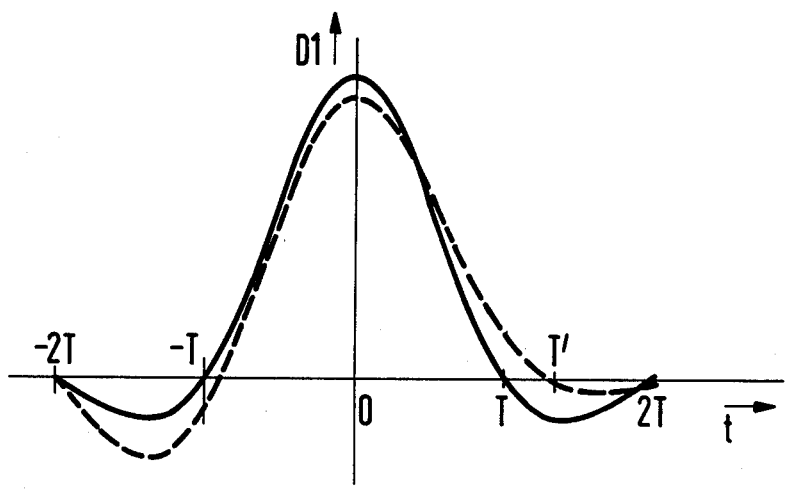
FIG. 2 shows waveform time diagrams of an undistorted and a distorted demodulated data pulse D1.

FIG. 2 shows an undistorted and distorted demodulated pulse D1; the time t is plotted by measuring parallel to the x-axis and the instantaneous values of the demodulated pulses D1 are plotted by measuring parallel to the y-axis. An undistorted single pulse is shown by a solid line, which pulse intersects the zero line at instants $-2T$, $-T$, $T$ and $2T$. A distorted single pulse 15 shown by a broken line which intersects the zero line at instant T'. With the aid of the switching circuit of the invention, the sampling instant is to be set in such a way that sampling occurs at the first zero crossing of the distorted single pulse after the maximum value (i.e., at instant T').

Utilizing regulation circuit RS, shown in FIG. 3, the repetition rate of clock pusles ET is varied in such a manner that they appear as near as possible at the first zero crossing T' of the distorted single pulse, shown in FIG. 2. Regulation circuit RS comprises a first switching stage S1 which generates a signal representing the difference between the instantaneous value of data signal D1 at the sampling instant and the desired value of data signal D1 (i.e., signal A). Switching stage S1 supplies at its output a signal SF corresponding to the sign of this difference. Signal A, corresponding to the desired value of data signal D1, is generated in threshold element ES. Signal A is also supplied to a second switching stage S2 which generates a signal SA corresponding to the sign of signal A. Signal SA is supplied to an input of shift register SR; clock pulses ET is supplied to the clock input of register SR which delays signal SA by the period of clock pulses ET. At the output of shift register SR there is supplied a signal SAV which corresponds to the sign of signal A delayed by the period of clock pulses ET. Signal SAV is applied at a first input of multiplier circuit M; multiplier circuit M may be formed from an Exclusive-OR circuit. Signal SF is applied at a second input of multiplier circuit M.

Multiplier circuit M supplies at its output a control signal RE which is applied to clock generator TG. This control signal RE varies the repetition rate of clock pulses ET in such a way that data signal D1 is sampled at the most favorable sampling time.

Further operating details of regulation circuit RS, shown in FIG. 3, will be described in conjunction with the time diagrams of FIG. 4.

The time waveform diagrams of FIG. 4 represent signals as they appear during the operation of regulation circuit RS of FIG. 3. The time t is plotted by measuring parallel to the x-axis and the instantaneous values of the signals are plotted by measuring parallel to the y-axis. The instantaneous values of data signal D1 are applied in the neighborhood of desired values A1 and −A1 at sampling instants t1 through t8. Switching stage S1 forms an error signal from the difference between the instantaneous values of data signal D1 and the desired values. For the example shown in FIG. 4, this error signal is positive at instants t1, t2, t5, t6 and t7, since the instantaneous value of data signal D1 at these instants is greater than desired value A1 or −A1. At instants t3, t7 and t8 the error signal is negative, since the instantaneous values of data signal D1 at these instants is less than desired values A1 or −A1.

Switching stage S1 supplies at its output the signal SF which is assigned to the sign of the error signal. This signal SF has the value +1 at instants t1, t2, t5, t6 and t7, since the error signal is positive at these instants. However, signal SF has the value −1 at instants t3, t4 and t8, since the error signal is negative at these instants.

Switching stage S2 supplies signal SA, which indicates the sign of desired values A1 or −A1. Since the desired values at instants t1, t4, t5, t6 and t8 are positive, signal SA has the value +1 at these instants. At instants t2, t3 and t7 the desired values are negative and signal SA thus has the value −1 at these instants.

Shift register SR delays signal SA by the period of clock pulses ET and supplies at its output the signal SAV. Signal SAV has the same values (i.e., +1 and −1) as signal SA but is delayed by a period T, corresponding to the period of clock pulses ET.

Multiplier circuit M multiplies signals SF and SAV and supplies control signal RE at its output. In the example shown in FIG. 4, control signal RE always has the value 1 at instants t1 through t8, since signals SAV and SF change to the same values at these instants.

Control signal RE is applied to clock generator TG, which alters the repetition rate of clock pulses ET in such a way that data signal D1 is sampled at a later time, thereby reducing the differences between the instantaneous values of signal D1 and the desired values A1 or −A1, as the case may be. The quantity by which the repetition rate of clock pulses ET is modified and which is initiated by control signal RE depends upon the corrective incremental parameters of clock generator TG.

I claim:

1. A switching circuit for regulating the repetition rate of clock pulses generated by a clock pulse generator, said generator determining the sampling instants at which a data signal transmitted from a data transmitter to a data receiver is sampled comprising:
 a threshold means coupled to said data signal for producing a desired value signal which represents the desired value of said data signal;
 a first switching means, receiving said data signal and said desired value signal, for producing a first switching output signal which represents the sign of the difference between said desired value signal and said data signal at said sampling instants;
 a second switching means, receiving said desired value signal, for producing a second switching output signal which represents the sign of said desired value signal;
 a delayed circuit means, receiving said second switching output signal and said clock pulses, for producing a delayed output signal which represents said second switching output signal delayed by a period of said clock pulses; and
 a multiplier circuit means, receiving said first switching output signal and said delayed output signal, for multiplying said first switching output signal by said delayed output signal to produce an output control signal which regulates said generator.

2. The switching circuit of claim 1 wherein said delay circuit means is a shift register.

3. The switching circuit of claim 1 wherein said multiplier circuit means is an Exclusive-OR logic device.

* * * * *